United States Patent
Huang et al.

(10) Patent No.: US 8,390,567 B2
(45) Date of Patent: Mar. 5, 2013

(54) SYSTEM AND METHOD FOR DETERMINING COORDINATES

(75) Inventors: I-Ming Huang, Banchiao (TW); Chin-Kang Chang, Taoyuan (TW); Ching-Chun Chiang, Tao Yuan Shien (TW); Hsin-Hung Lee, Fongshan (TW); Yun-Cheng Liu, Banciao (TW)

(73) Assignee: Quanta Computer Inc., Tao Yuan Shien (TW)

( * ) Notice: Subject to any disclaimer, the term of this patent is extended or adjusted under 35 U.S.C. 154(b) by 969 days.

(21) Appl. No.: 12/216,816

(22) Filed: Jul. 11, 2008

(65) Prior Publication Data

US 2009/0195500 A1    Aug. 6, 2009

(30) Foreign Application Priority Data

Feb. 1, 2008    (TW) .............................. 97103887 A

(51) Int. Cl.
    *G06F 3/033* (2006.01)
(52) U.S. Cl. ....................................................... 345/157
(58) Field of Classification Search .................. 345/156, 345/157, 158; 382/174
    See application file for complete search history.

(56) References Cited

U.S. PATENT DOCUMENTS

| | | | | |
|---|---|---|---|---|
| 5,706,419 A * | 1/1998 | Matsugu et al. | ............... | 345/420 |
| 6,275,214 B1 * | 8/2001 | Hansen | .......................... | 345/158 |
| 6,885,363 B2 * | 4/2005 | Smith | ............................ | 345/157 |
| 2003/0206655 A1 * | 11/2003 | Huang | ............................ | 382/218 |
| 2008/0174516 A1 * | 7/2008 | Xiao et al. | ....................... | 345/1.3 |

* cited by examiner

*Primary Examiner* — Alexander Eisen
*Assistant Examiner* — Mark Regn
(74) *Attorney, Agent, or Firm* — McClure, Qualey & Rodack, LLP

(57) ABSTRACT

A coordinate determining system is disclosed. The coordinate determining system comprises an image capturing module, a dividing module, a determining module, and a converting module. The image capturing module is used for capturing a plurality of images corresponding to the screen. The dividing module is used for dividing an overlapping image region of the images into a target image comprising a plurality of sub-regions. The determining module is used for determining a position of the indicating point on the target image. If the indicating point is in a target sub-region among the sub-regions and has an image coordinate relative to an original of the target sub-region, the converting module will convert the image coordinate into the screen coordinate according to a proportional parameter.

12 Claims, 7 Drawing Sheets

SYSTEM AND METHOD FOR DETERMINING COORDINATES

BACKGROUND OF THE INVENTION

1. Field of the Invention

The invention relates to a coordinate determining system and method, and in particular, to a coordinate determining system and method for determining a screen coordinate of an indicating point on a screen.

2. Description of the Prior Art

In recent year, due to the advance of image display technology, the current display panel is able to support touch control input and infrared projecting input. The touch panel is widely applied to various electrical productions, for example, an automatic teller machine (ATM), a sale point terminal, a tourist guiding system or an industry controlling system.

An ordinary touch control panel can use a video camera or a camera to picture an image comprising a screen region, and a single touch point on the panel can be detected via finishing the correspondence between the image and the actual position on the screen.

However, the images comprising the screen region pictured by the video camera or the camera are always distorted. Especially, when the fish-eye camera lens is used for picturing an image, the distortion, pincushion distortion and barrel distortion, becomes more serious. Although the two distortions are generally occurred, it can be adjusted via corresponding adjusting equations. However, if an image region of image is adjusted, the more complicated adjusting equations are needed to correctly correspond the coordinate of touch control points in the image to the coordinate on the actual screen. Consequently, it needs a lot of operating resources, and it is time-consuming and inconvenient for users.

Therefore, the main scope of the invention is to provide a coordinate determining system and a coordinate determining method to solve the above-mentioned problems.

SUMMARY OF THE INVENTION

The invention provides a coordinate determining system and a coordinate determining method. An embodiment according to the invention is a coordinate determining system. And, the coordinate determining system is used for determining a screen coordinate of an indicating point shown on a screen.

The coordinate determining system comprises an image capturing module, a dividing module, a determining module, and a converting module. The image capturing module is used for capturing a plurality of screen images corresponding to the screen. The dividing module is coupled to the image capturing module and used for dividing an overlapping image region of the images into a target image comprising a plurality of sub-regions. If the indicating point is in a target sub-region among the sub-regions and has an image coordinate relative to an origin of the target sub-region, the converting module will convert the image coordinate into the screen coordinate according to a proportional parameter.

Compared to the prior art, the coordinate determining system and coordinate determining method based on the invention can prevent the drawback that the complicated adjusting equations must be used to adjust the distorted image in the conventional camera image adjusting process.

The advantage and spirit of the invention may be understood by the following recitations together with the appended drawings.

BRIEF DESCRIPTION OF THE APPENDED DRAWINGS

FIG. 1 shows a functional block diagram of the coordinate determining system of an embodiment according to the invention.

FIG. 2(A) and FIG. 2(B) show the schematic diagram of vertical bars and horizontal bars on the screen projected by the dividing module respectively.

Figure 9A:
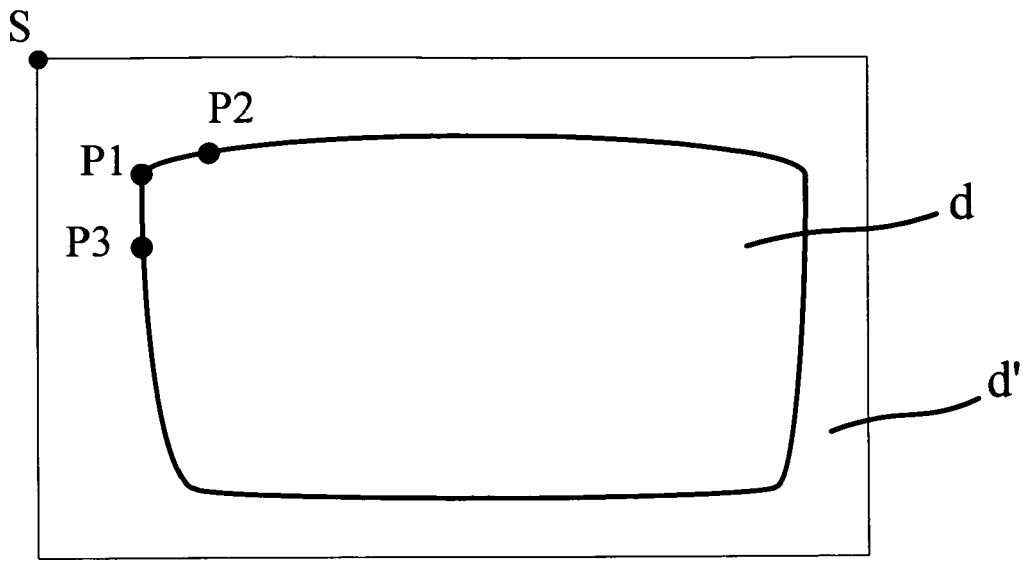
Figure 9B:
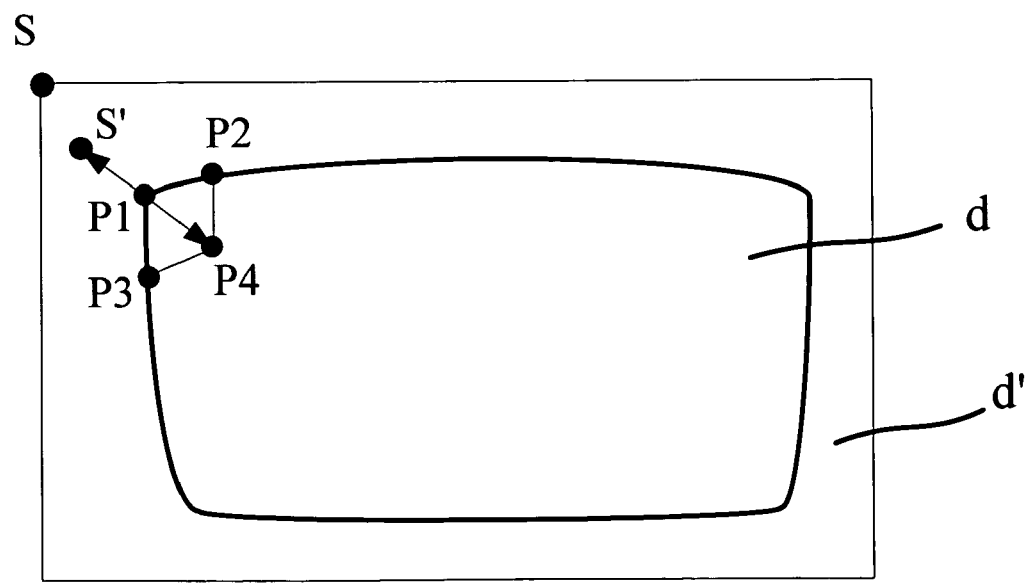

FIG. 9(A) and FIG. 9(B) show an example of a new fiducial point finding method.

Figure 10:
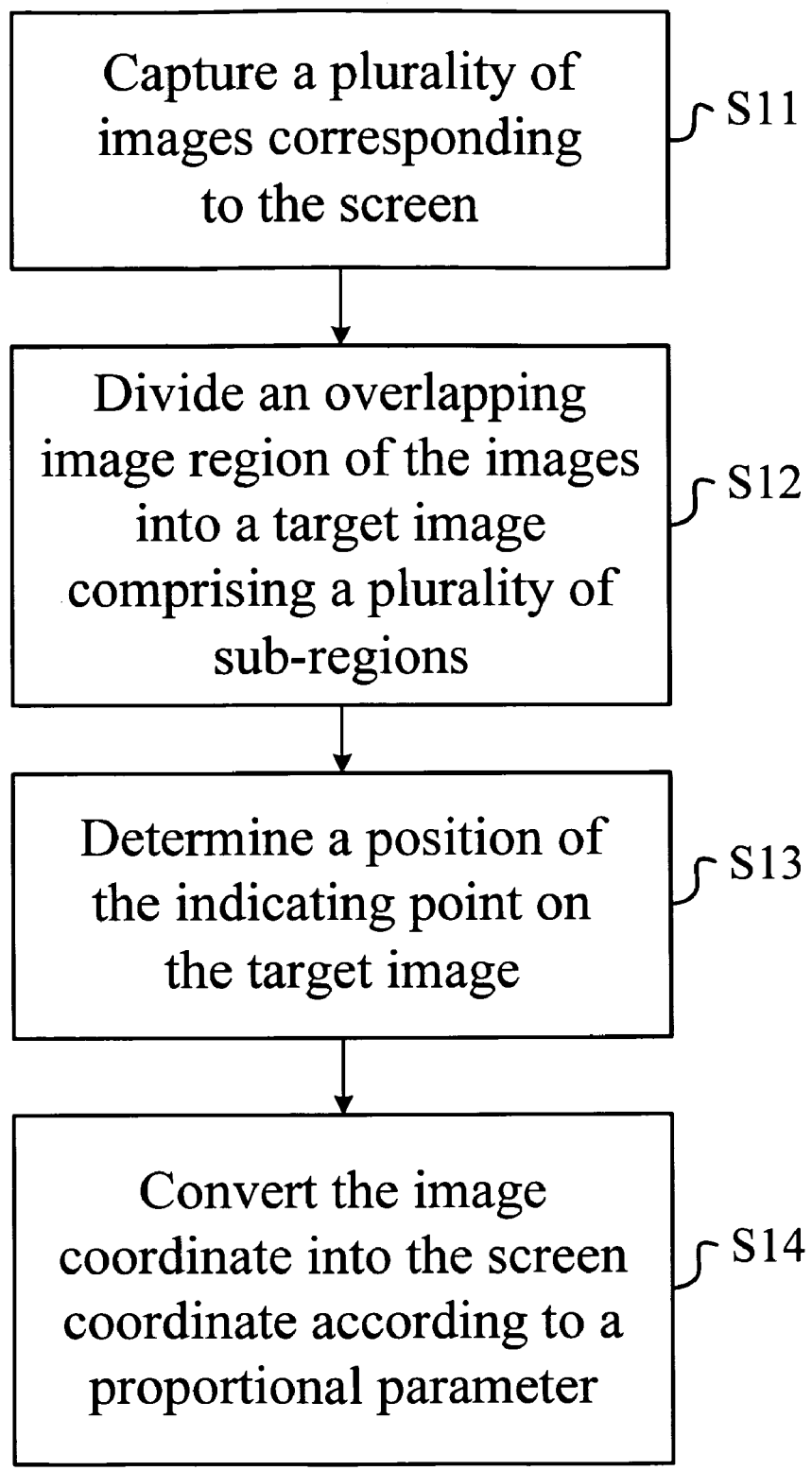

FIG. 10 shows a flowchart of the coordinate determining method of another embodiment according to the invention.

DETAILED DESCRIPTION OF THE INVENTION

Figure 1:
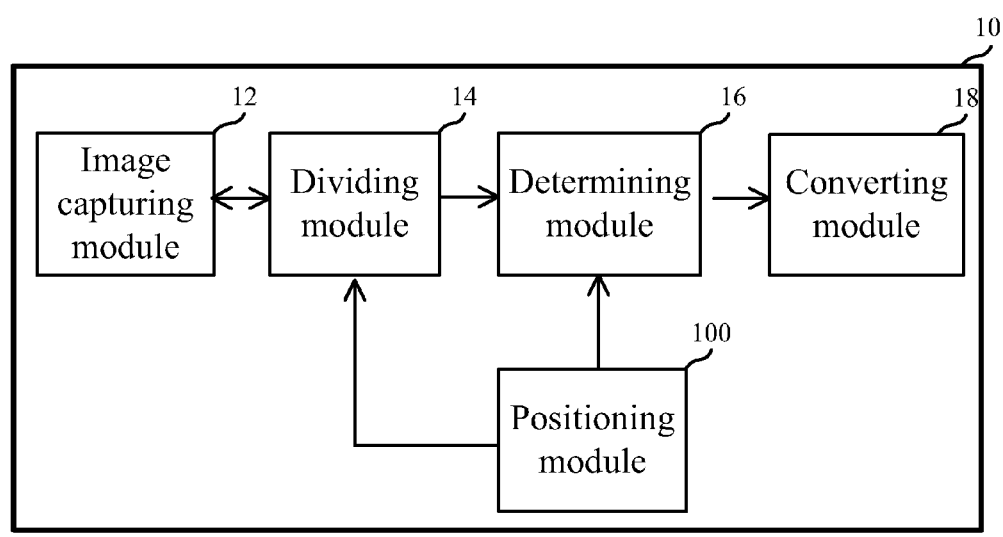

According to the invention, the first embodiment is a coordinate determining system. The coordinate determining system is used for determining a screen coordinate of an indicating point on a screen. In practical applications, the indicating point can be a touch control inputting point or an infrared projecting point. Please refer to FIG. 1. FIG. 1 shows a functional block diagram of the coordinate determining system.

As shown in FIG. 1, the coordinate determining system 10 comprises an image capturing module 12, a dividing module 14, a determining module 16, and a converting module 18. The image capturing module 12 is used for capturing a plurality of screen images corresponding to the screen. In practical applications, the image capturing module 12 can be a camera with fish-eye lens or a video camera. For example, a user can set a video camera with fish-eye lens on the top of a LCD monitor to picture an image related to the screen of the LCD monitor.

The dividing module 14 is coupled to the image capturing module 12 and used for generating a target image according to an overlapping image region of the plurality of screen images. In fact, the target image can be generated by dividing the overlapping image region of screen images into a plurality of sub-regions. Thus, the target image comprises the plurality of sub-regions.

Figure 2A:
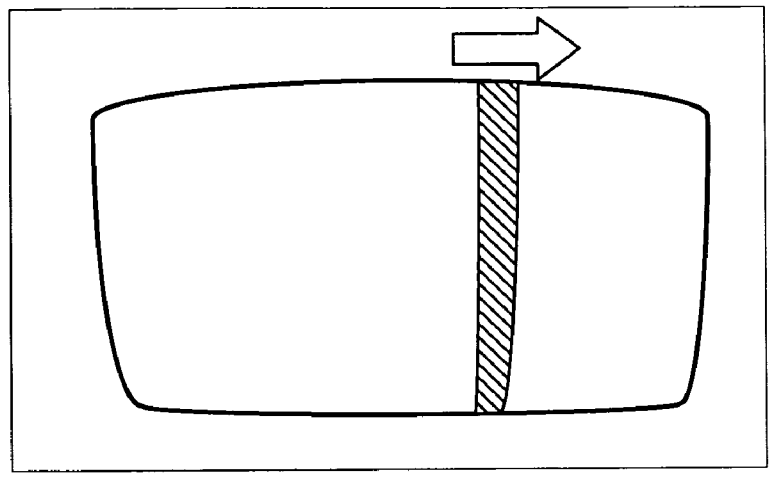
Figure 2B:
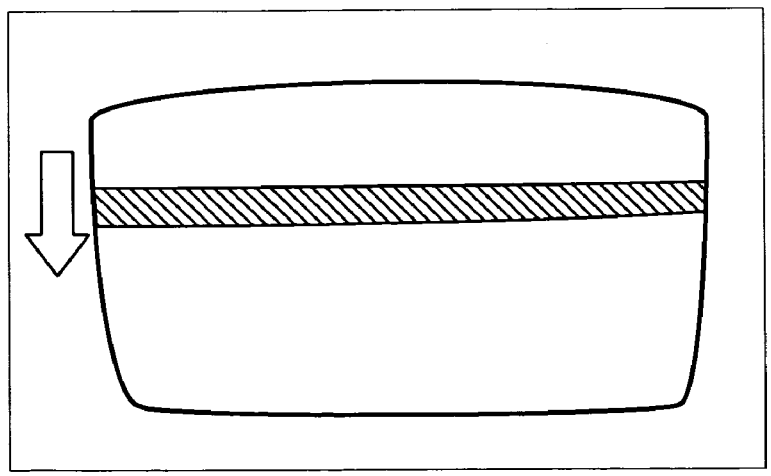
Figure 3:
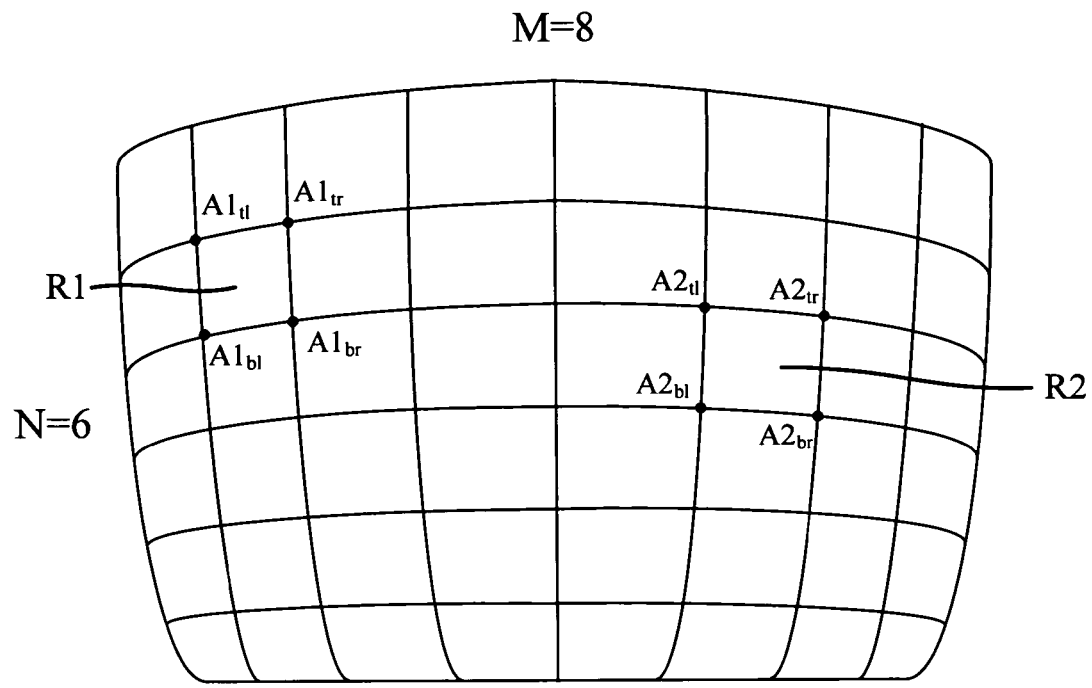
FIG. 3 shows the schematic diagram of the 48 image sub-regions divided by the dividing module from the image region of an image.

In practical applications, as shown in FIG. 2(A) and FIG. 2(B), the dividing module 14 can divide the screen region into M vertical bars in horizontal direction and N horizontal bars in vertical direction by projecting the M vertical bars and the N horizontal bars at different time respectively. The image capturing module 12 takes images comprising only a vertical bar or a horizontal bar, and the captured images are stored in the system (e.g., a host) until all M vertical bars and N horizontal bars are projected. The system calculates the overlapping regions generated from the M vertical bars and the N horizontal bars, i.e. the overlapping regions are the (M*N) sub-regions. As shown in FIG. 3, if M is 8 and N is 6, all captured images will be overlapped by the dividing module 14 to generate the target image comprising 48 sub-regions.

The determining module 16 is electrically connected to the dividing module 14, and used for determining an image coordinate of the indicating point in the target image. In detail, the determining module 16 can judge which sub-region of the image the indicating point is located within. In addition, since M, N, and the screen resolution are already known, the proportional parameter that each sub-region corresponds to the region or position of the screen can be calculated. The detail will be described in the following embodiment.

Figure 4:
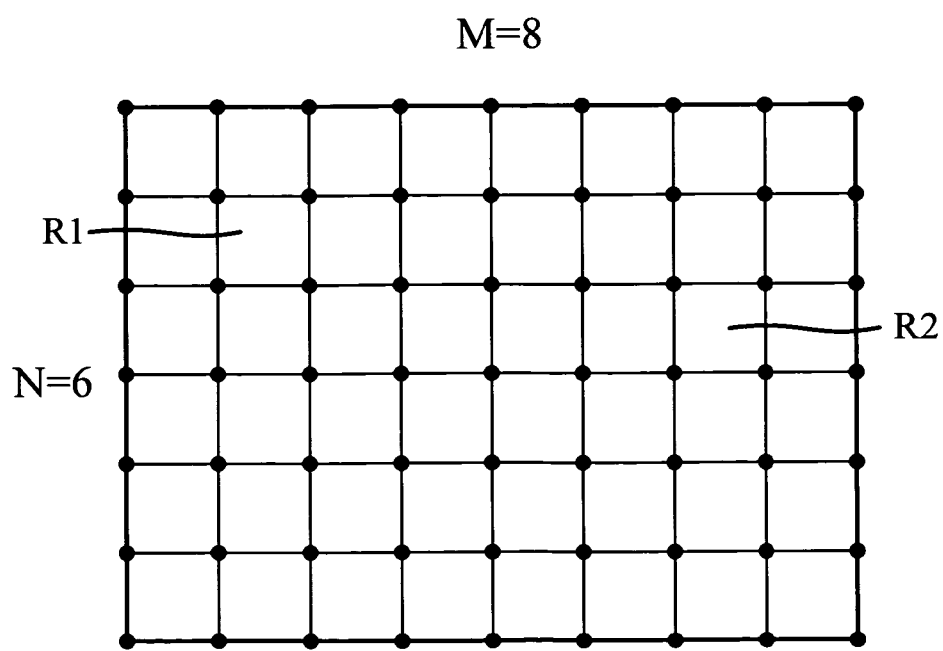
FIG. 4 shows the schematic diagram of dividing the screen region into 48 screen sub-regions.

Please refer to FIG. 3 and FIG. 4. FIG. 3 shows the schematic diagram of the 48 sub-regions divided by the dividing module 14 from the image captured by the captured module 12. FIG. 4 shows the schematic diagram of dividing the screen into 48 regions. In fact, because the sub-regions are captured by the captured module 12 and divided by the dividing module 14, each of sub-regions is distorted. And each of the sub-region boundaries is blurred (e.g., in a form of indentation or discontinuousness), unlike the one with clear and continuous boundary shown in FIG. 3. Thus, the region or position of each sub-region must be further determined to aid the following step of matching each of sub-regions (e.g., the sub-regions R1 and R2 in FIG. 3) to the screen regions (e.g., R1 and R2 in FIG. 4).

In practical applications, each sub-region can be determined by its four grid points or apexes (e.g., the sub-region R1 in FIG. 3 can be determined by the grid points A1tl, A1tr, A1bl, and A1br; the sub-region R2 can be determined by the grid points A2tl, A2tr, A2bl, and A2br). Thus, the coordinate determining system 10 can further comprise a positioning module 100. The positioning module 100 is electrically connected to the dividing module 14 and the determining module 16, and used for positioning the [(M+1)*(N+1)] grid points formed by the (M*N) sub-regions.

As shown in FIG. 3, because M is 8 and N is 6, the image region of the image will be divided into 8*6=48 sub-regions, and (8+1)*(6+1)=63 grid points are formed by the sub-regions. By doing so, the determining module 16 can determine the indicating point is in the (a, b) sub-region based on the line equations formed by the grid points.

Then, an example is provided to explain how the positioning module determines the positions of the grid points forming a distorted sub-region, namely, how to determine the grid points $A1_{tl}$, $A1_{tr}$, $A1_{bl}$, and $A1_{br}$ in the sub-region R1.

Figure 5:
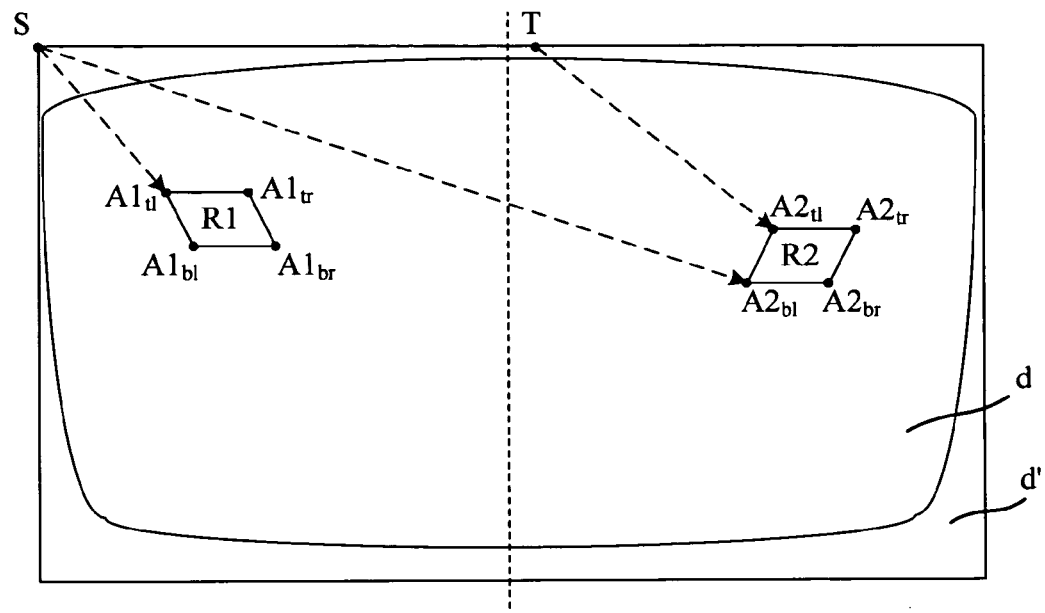
FIG. 5 shows the image comprising screen pictured by the fish-eye lens.

Please refer to FIG. 5. FIG. 5 shows the image comprising screen pictured by the fish-eye lens. For positioning the upper left grid point $A1_{tl}$ of the sub-region R1, the positioning module set the upper left corner S of the image as a fiducial point, and the nearest point in the sub-region R1 to the fiducial point S is defined as the upper left grid point $A1_{tl}$ of the sub-region R1. Namely, the upper left corner, upper right corner, lower left corner, and lower right corner of the image are set as the fiducial points, and the nearest point in each sub-region to the fiducial points is defined as the grid point of the sub-region by the positioning module. In detail, the upper left corner of the image is set as a first fiducial point, and the nearest point in each sub-region to the first fiducial point is defined as the upper left grid point of the sub-region by the positioning module.

The upper right corner of the image is set as a second fiducial point, and the nearest point in each sub-region to the second fiducial point is defined as the upper right grid point of the sub-region by the positioning module. The lower left corner of the image is set as a third fiducial point, and the nearest point in each sub-region to the third fiducial point is defined as the lower left grid point of the sub-region by the positioning module. The lower right corner of the image is set as a fourth fiducial point, and the nearest point in each sub-region to the fourth fiducial point is defined as the lower right grid point of the sub-region by the positioning module.

However, as shown in FIG. 5, if the positioning module uses the fiducial point S to position the upper left grid point $A2_{tl}$ of the sub-region R2, the nearest point in sub-region R2 to the fiducial point S is the lower left grid point $A2_{bl}$ of the sub-region R2 instead of the upper left grid point $A2_{tl}$ of the sub-region R2. In order to prevent this judgment error, the fiducial point T is used to position the upper left grid point $A2_{tl}$ of the sub-region R2 instead of the fiducial point S. And, the position of the fiducial point T is near the upper middle point of the image.

Then, the positioning module can use the fiducial point T to position the upper left grid point $A2_{tl}$ of the sub-region R2 correctly. Similarly, the upper right grid point, the lower left grid point, and the lower right grid point can be generated in similar ways.

In other words, the upper middle point and the lower middle point of the image are also set as the fiducial points along with the four image corner fiducial points. The positioning module selects the fiducial points based on the location of the sub-region first, and then defines the nearest points in the sub-region to the fiducial points as the grid points of the sub-region.

Figure 6:
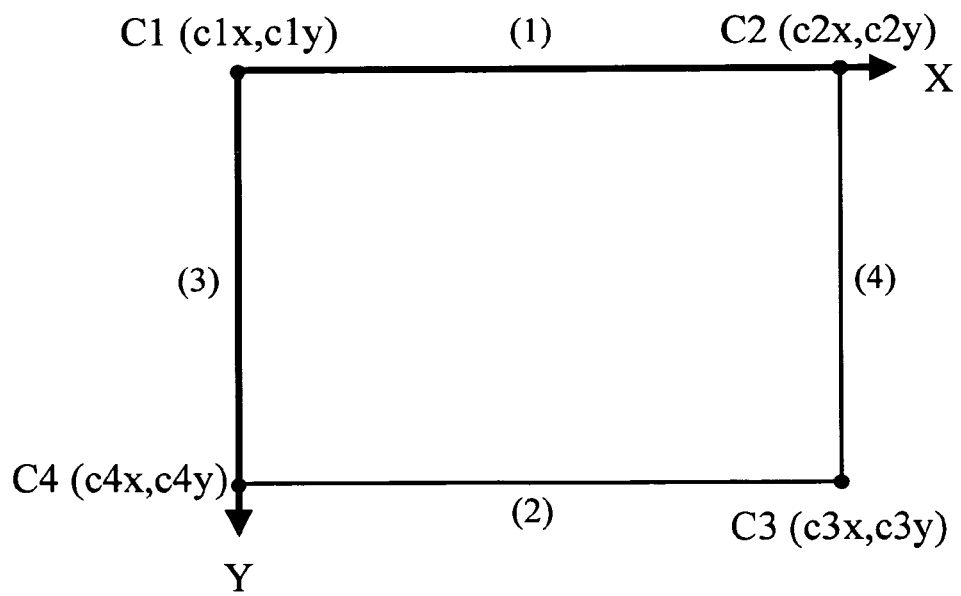
FIG. 6 shows four line equations formed by the four grid points of the sub-region.

The following example is taken to explain how to judge which sub-region the indicating point is located within. As shown in FIG. 6, once four grid points C1 (c1x,c1y), C2 (c2x,c2y), C3 (c3x,c3y), and C4 (c4x,c4y) of a sub-region have defined, two horizontal line equations would be formed by the grid points C1, C2, C3, and C4:

$$y = c1y + \frac{(c2y - c1y)}{(c2x - c1x)}(x - c1x) \quad (1)$$

$$y = c4y + \frac{(c3y - c4y)}{(c3x - c4x)}(x - c4x) \quad (2)$$

And, two vertical line equations formed by the grid points C1, C2, C3, and C4 are as follows:

$$x = c1x + \frac{(c4x - c1x)}{(c4y - c1y)}(y - c1y) \quad (3)$$

$$x = c2x + \frac{(c3x - c2x)}{(c3y - c2y)}(y - c2y) \quad (4)$$

Therefore, any indicating point (X,Y) in the sub-region will meet the following inequalities (5)~(8).

$$Y \geq c1y + \frac{(c2y - c1y)}{(c2x - c1x)}(X - c1x) \quad (5)$$

$$Y < c4y + \frac{(c3y - c4y)}{(c3x - c4x)}(X - c4x) \quad (6)$$

$$X \geq c1x + \frac{(c4x - c1x)}{(c4y - c1y)}(Y - c1y) \quad (7)$$

$$X < c2x + \frac{(c3x - c2x)}{(c3y - c2y)}(Y - c2y) \quad (8)$$

It should be noticed that while using looping algorithm to calculate all sub-regions in the screen region, the sub-region of the indicating point can be easily determined via the inequalities (5)~(8), and the coordinates corresponding to the grid points C1~C4 can also be obtained. Besides, among all sub-regions, there is at most one sub-region which can meet all of the inequalities (5)~(8) at the same time. However, it is possible that the indicating point is not in any sub-regions. That is to say, it is possible that the position of the indicating point is out of the screen region. For example, the position of the indicating point can be the region d' between the image boundary and the screen region.

The converting module 18 is coupled to the determining module 16. If the determining module 16 determines that the indicating point is in the (a,b) sub-region among the (M*N) sub-regions, the indicating point has a image coordinate (x,y) related to a relating origin of the (a,b) sub-region, wherein a is a positive integer less than M, and b s a positive integer less than N. In detail, since the (M*N) sub-regions comprise M columns and N rows, the (a,b) sub-region is the sub-region which is in the ath column among M columns and in the bth row among N rows. Then, the converting module 18 will convert the image coordinate (x,y) into the screen coordinate (X,Y) according to a proportional parameter.

Figure 7:
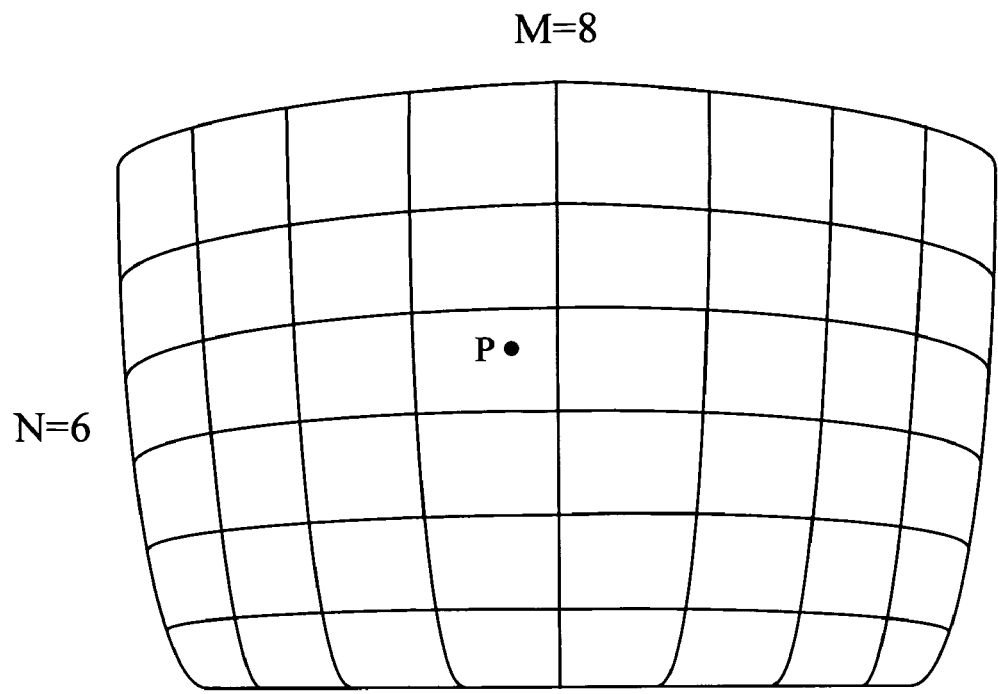
FIG. 7 shows that the indicating point P is determined in the (4,3) sub-region.
Figure 8:
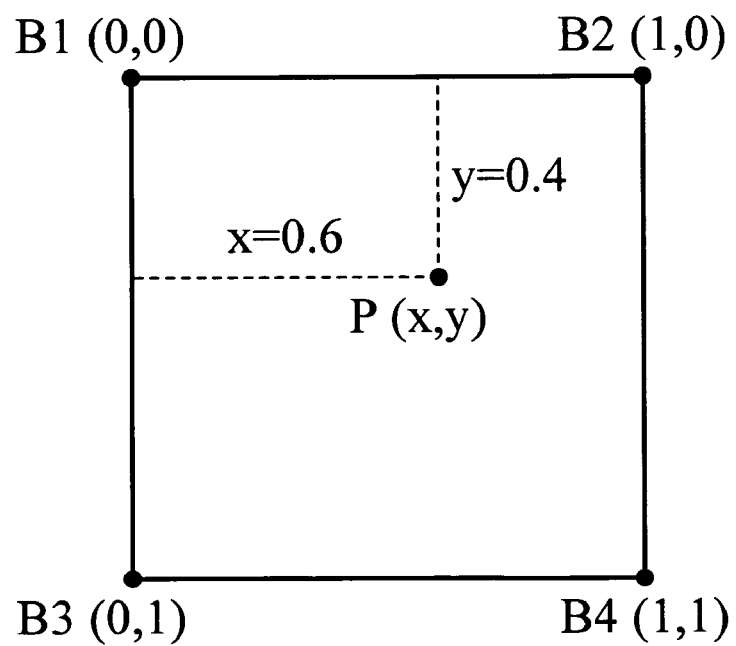
FIG. 8 shows the schematic diagram of the (4,3) sub-region shown in FIG. 7.

For example, as shown in FIG. 7, it is assumed that the image region of an image is divided into 48 sub-regions, and the indicating point P is in the (4,3) sub-region determined by the determining module 16. FIG. 8 shows the schematic diagram of the (4,3) sub-region shown in FIG. 7. As shown in FIG. 8, the upper left grid point in the (4,3) sub-region is assumed to be the relative origin B1 (0,0), and a normalized coordinate system is used in the sub-region. Therefore, the other three grid points of the sub-region are B2 (1,0), B3 (0,1), and B4 (1,1) respectively. If the indicating point P in the sub-region has an image coordinate (x,y) relative to B1 (0,0), the image coordinate (x,y) is also a normalized coordinate, wherein $0 \leqq x,y \leqq 1$. As shown in FIG. 8, the image coordinate of the indicating point P is (0.6, 0.4) in this example.

The converting module 18 will convert the image coordinate (x,y) into the screen coordinate (X,Y) based on a proportional parameter. The proportional parameter is determined by a horizontal distance and a vertical distance between the indicating point and the four grid points corresponding the (a,b) sub-region.

In addition, if a screen region of the screen is also divided into (M*N) screen sub-regions and each of the screen sub-regions has a width W and a height H, then the screen coordinate (X,Y) of an image coordinate (x,y) relative to a screen origin (0,0) of the screen can be interpreted as [((a−1)+x)*W, ((b−1)+y)*H].

For example, if the determining module 16 determines that the indicating point P is in the (4,3) sub-region and the image coordinate of the indicating point P is (0.6,0.4) relative to the relative origin B1 (0,0) of the sub-region. Like the image region of the image, the screen region of the screen is divided into 48 screen sub-regions. If the width of the screen region is 64 cm and the height of the screen region is 36 cm, then the width of screen sub-region is 64/8=8 cm and the height of screen sub-region is 36/6=6 cm. If the screen coordinate (X,Y) of the indicating point P is relative to the screen origin O (0,0) of the screen, then X=[((4−1)+0.6)0.8]=28.8 cm, Y=[(((3−1)+0.4)0.6]=14.4 cm; namely, the screen coordinate of the indicating point P is (28.8 cm, 14.4 cm). In addition, the length definition of the screen region can be replaced by the screen resolution. For example, if the screen resolution is 1024*768, then the screen size corresponding to each of screen sub-regions is (1024/8)*(768/6)=128*128

In practical applications, the coordinate determining system 10 can further comprise a look-up table. The look-up table records the screen coordinate (X,Y) corresponding to the (a,b) sub-region and the image coordinate (x,y). If the width of each screen sub-region is W and the height of each screen sub-region is H (or resolution), then the converting module 18 can quickly convert the image coordinate (x,y) into the screen coordinate (X,Y) according to the look-up table.

In addition, some grid points positioned by the positioning module using the above-mentioned method will be obviously tilled (or error) due to the position of the image capturing module 12.

In order to adjust the positions of these tilled grid points to the positions near the original grid points (the curve formed by the neighboring grid points will be coincidence), the refining step must be performed.

Please refer to FIG. 9(A) and FIG. 9(B). FIG. 9(A) and FIG. 9(B) shows an example of finding a new fiducial point to perform the refining step. As shown in FIG. 9(A), d represents the screen region, d' is the region out of the screen region. S is the originally upper left fiducial point of a sub-region, P1 is the upper left grid point of the screen region d according to the above-mentioned method, P2 is the next point (or pixel) to P1 in the right direction, and P3 is the next point (or pixel) to P1 in the lower direction. As shown in FIG. 9(B), the fourth end point of the parallelogram formed by points P1, P2, and P3 is the reference point P4.

Then, an adjusting vector P1P4 can be formed according to P1 and P4, and a new upper left fiducial point S' of the sub-region can be generated by subtracting the adjusting vector P1P4 from P1. Similarly, other new fiducial points of the sub-region can also be generated respectively. Afterward, the positioning module will use these new fiducial points to adjust (or reposition) the position of diverged grid point to the new grid point position.

In other words, the reference point is the fourth end point of the parallelogram determined by a corner grid point of the image comprising (M*N) sub-regions and its neighboring or next points; the adjusting vector can be generated by connecting the reference point with the corner grid points of the image. And, a new fiducial point can be generated by subtracting the adjusting vector from the corner grid point.

Another embodiment according to the invention is a coordinate determining method. Please refer to FIG. 10. FIG. 10 shows a flowchart of the coordinate determining method. The coordinate determining method is used for determining a screen coordinate (X,Y) of an indicating point shown on a screen. In practical applications, the indicating point can be a touch control inputting point or an infrared projecting point.

As shown in FIG. 10, in the coordinate determining method, step S11 is performed for capturing a plurality of images corresponding to the screen first. Next, step S12 is performed for dividing an overlapping image region of the images into a plurality of sub-regions. In this embodiment, the target image has (M*N) sub-regions. M and N are both positive integers. Then, step S13 is performed for determining a position of the indicating point on the target image. So that an image coordinate of the indicating point in the target image can be determined.

In this embodiment, if the position of the indicating point is determined in the (a,b) sub-region among the (M*N) sub-regions and the indicating point has an image coordinate (x,y) relative to an origin of the (a,b) sub-region, step S14 is performed for converting the image coordinate (x,y) into the screen coordinate (X,Y) according to a proportional parameter, wherein a is a positive integer less than M and b is a positive integer less than N.

In practical applications, after step S12 is performed, the method can position the [(M+1)*(N+1)] grid points formed by the (M*N) sub-regions. Then, the method can further determine that the indicating point is in the (a,b) sub-region according to a plurality of line equations formed by the grid points.

In addition, the method can also convert the image coordinate (x,y) into the screen coordinate (X,Y) according to a look-up table, wherein the screen coordinate (X,Y) corresponding to the (a,b) sub-region and the image coordinate (X,Y) is stored in the look-up table.

If a screen region of the screen is also divided into (M*N) screen sub-regions and each of the screen sub-regions has a width W and a height H, then the screen coordinate (X,Y) relative to a screen origin (0,0) of the screen can be interpreted as [((a−1)+x)*W, ((b−1)+y)*H].

Compared to the prior art, the coordinate determining system and coordinate determining method based on the invention can prevent the drawback that the complicated adjusting equations must be used to adjust the distorted image in conventional camera image adjusting process.

With the above example and explanation, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A coordinate determining system for determining a screen coordinate (X,Y) of an indicating point shown on a screen, the coordinate determining system comprising:
   an image capturing module for capturing a plurality of images corresponding to the screen and a dividing module coupled to the image capturing module for dividing an overlapping image region of the images into a target image comprising (M*N) sub-regions, wherein a plurality of vertical bars and horizontal bars are projected on the screen at different time respectively by the dividing module, the plurality of images comprise one of the vertical bars or one of the horizontal bars respectively;
   a determining module, coupled to the dividing module, for determining a position of the indicating point on the target image comprising the (M*N) sub-regions;
   a positioning module, coupled to the dividing module and the determining module, for positioning a plurality of grid points formed by the sub-regions according to a plurality of fiducial points, the determining module determining a target sub-region according to a plurality of line equations formed by the grid points, wherein the positioning module adjusts the plurality of fiducial points according to an adjusting vector, wherein a reference point is generated from a parallelogram determined by the corner grid point of the target image and its neighboring grid points such that the adjusting vector is generated by connecting the reference point and the corner grid point, and a new fiducial point is generated by subtracting the adjusting vector from the corner grid point; and
   a converting module, coupled to the determining module, if the position of the indicating point is in the target sub-region (a,b) among the (M*N) sub-regions and has an image coordinate (x,y) relative to an origin of the target sub-region (a,b), the converting module converting the image coordinate (x,y) into the screen coordinate (X,Y) according to a proportional parameter, wherein a is a positive integer less than M, and b is a positive integer less than N.

2. The coordinate determining system of claim 1, wherein the positioning module defines an upper left corner, an upper right corner, a lower left corner, and a lower right corner of the target image as the plurality of fiducial points and determines the nearest points in each sub-region to the plurality of fiducial points as the grid points of the each sub-region.

3. The coordinate determining system of claim 2, wherein the positioning module further adds an up-middle point and a lower-middle point of the target image to the plurality of fiducial points and selects the corresponding fiducial point according to the position of each sub-region.

4. The coordinate determining system of claim 1, wherein the positioning module defines an upper left corner of the target image as a first fiducial point and determines the nearest point in each sub-region to the first fiducial point as an upper left grid point of the sub-region; defines an upper right corner of the target image as a second fiducial point and determines the nearest point in each sub-region to the second fiducial point as an upper right grid point of the sub-region; defines an lower left corner of the target image as a third fiducial point and determines the nearest point in each sub-region to the third fiducial point as a lower left grid point of the sub-region; and defines an lower right corner of the target image as a fourth fiducial point and determines the nearest point in each sub-region to the fourth fiducial point as a lower right grid point of the sub-region.

5. The coordinate determining system of claim 1, further comprising:
   a look-up table for storing the screen coordinate corresponding to the target sub-region and the image coordinate, the converting module converting the image coordinate into the screen coordinate according to the look-up table.

6. The coordinate determining system of claim 1, wherein the indicating point is a touch control inputting point or an infrared projecting point.

7. The coordinate determining system of claim 1, wherein the image capturing module is a camera or a video camera with a fish-eye lens.

8. The coordinate determining system of claim 1, wherein the proportional parameter is determined by a horizontal distance and a vertical distance between the indicating point and the four grid points of the target sub-region.

9. A coordinate determining method for determining a screen coordinate (X,Y) of an indicating point shown on a screen, the coordinate determining method comprising the steps of:
   projecting a plurality of vertical bars and horizontal bars on the screen at different time respectively and capturing a plurality of images corresponding to the screen, wherein the plurality of images comprise one of the vertical bars or one of the horizontal bars respectively;
   dividing an overlapping image region of the images into a target image comprising (M*N) sub-regions;
   positioning a plurality of grid points formed by the sub-regions according to a plurality of fiducial points, wherein the plurality of fiducial points are adjusted by the steps of:
      generating a reference point from a parallelogram determined by the corner grid point of the target image and its neighboring grid points;
      generating the adjusting vector by connecting the reference point and the corner grid point; and
      generating a new fiducial point by subtracting the adiustinq vector from the corner grid point;

determining a position of the indicating point on the target image comprising the (M*N) sub-regions according to a plurality of line equations formed by the grid points; and converting, if the position of the indicating point is in a target sub-region (a,b) among the (M*N) sub-regions and has an image coordinate (x,y) relative to an origin of the target sub-region (a,b), the image coordinate (x,y) into the screen coordinate (X,Y) according to a proportional parameter, wherein a is a positive integer less than M, and b is a positive integer less than N.

10. The coordinate determining method of claim 9, further comprising the steps of:

defining an upper left corner, an upper right corner, a lower left corner, and a lower right corner of the target image as the plurality of fiducial points; and determining the nearest points in each sub-region to the plurality of fiducial points as the grid points of the each sub-region.

11. The coordinate determining method of claim 10, further comprising the steps of:

adding an up-middle point and a lower-middle point of the target image into the plurality of fiducial points; and selecting the corresponding fiducial point according to the position of each sub-region.

12. The coordinate determining method of claim 9, further comprising the step of:

converting the image coordinate into the screen coordinate according to a look-up table, wherein the look-up table stores the screen coordinate corresponding to the image coordinate.

* * * * *